(No Model.) 3 Sheets—Sheet 1.
W. WITTHOEFT, Jr.
AUTOMATIC STATIONARY WATER FILTER.
No. 383,089. Patented May 15, 1888.
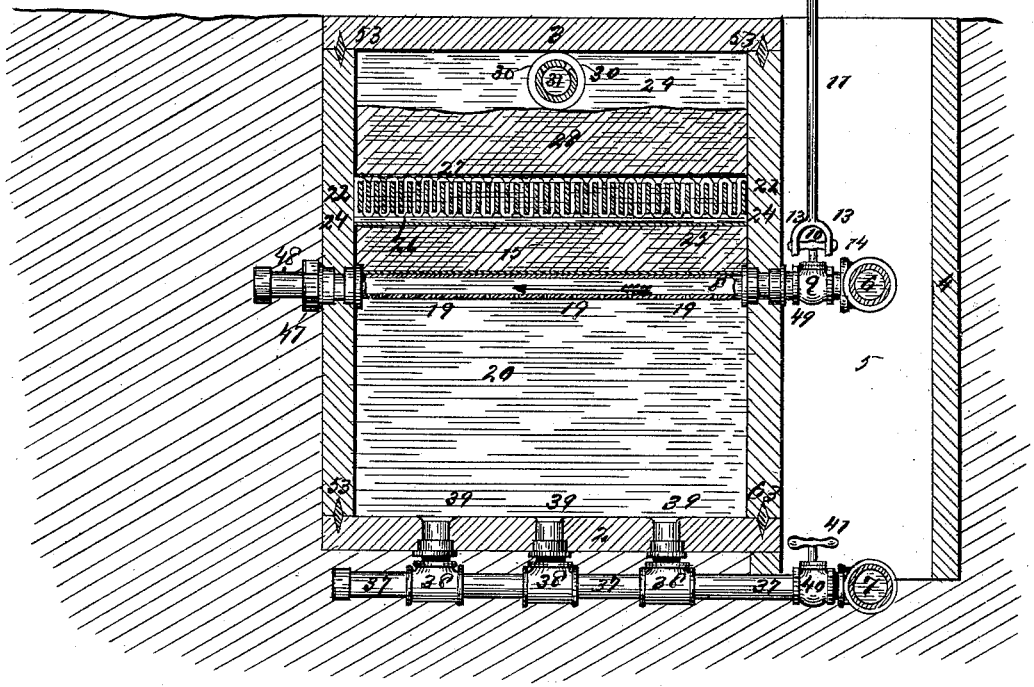
Fig. I.
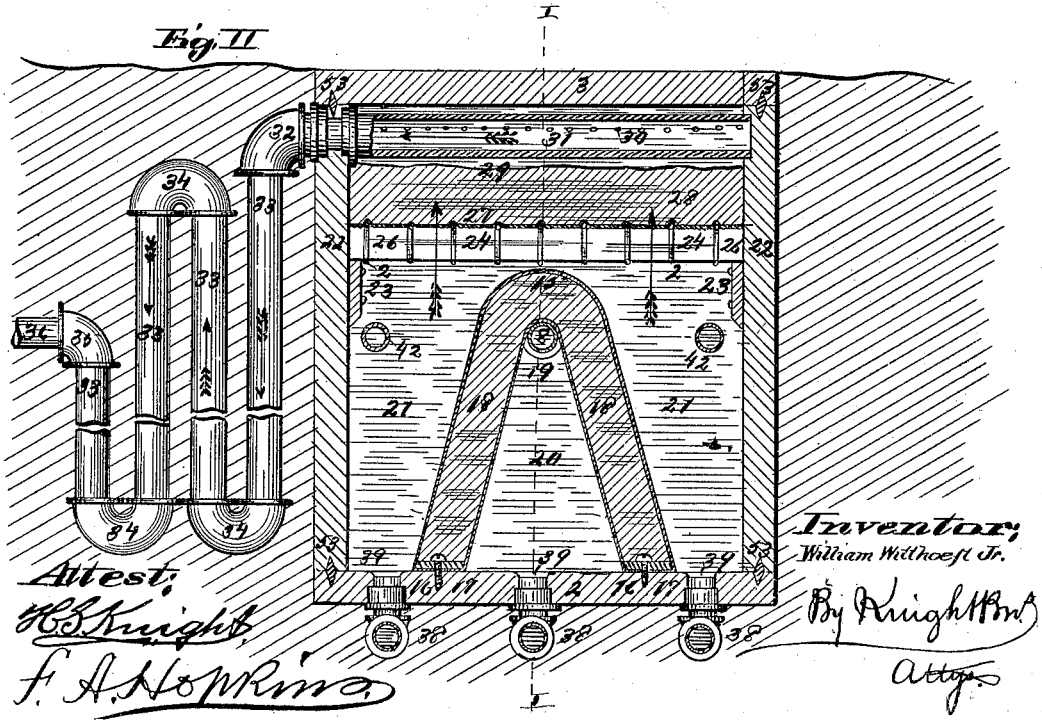
Fig. II.
Attest:
H. S. Knight
F. A. Hopkins
Inventor:
William Witthoeft Jr.
By Knight Bro.
Attys.

(No Model.) 3 Sheets—Sheet 2.
W. WITTHOEFT, Jr.
AUTOMATIC STATIONARY WATER FILTER.
No. 383,089. Patented May 15, 1888.
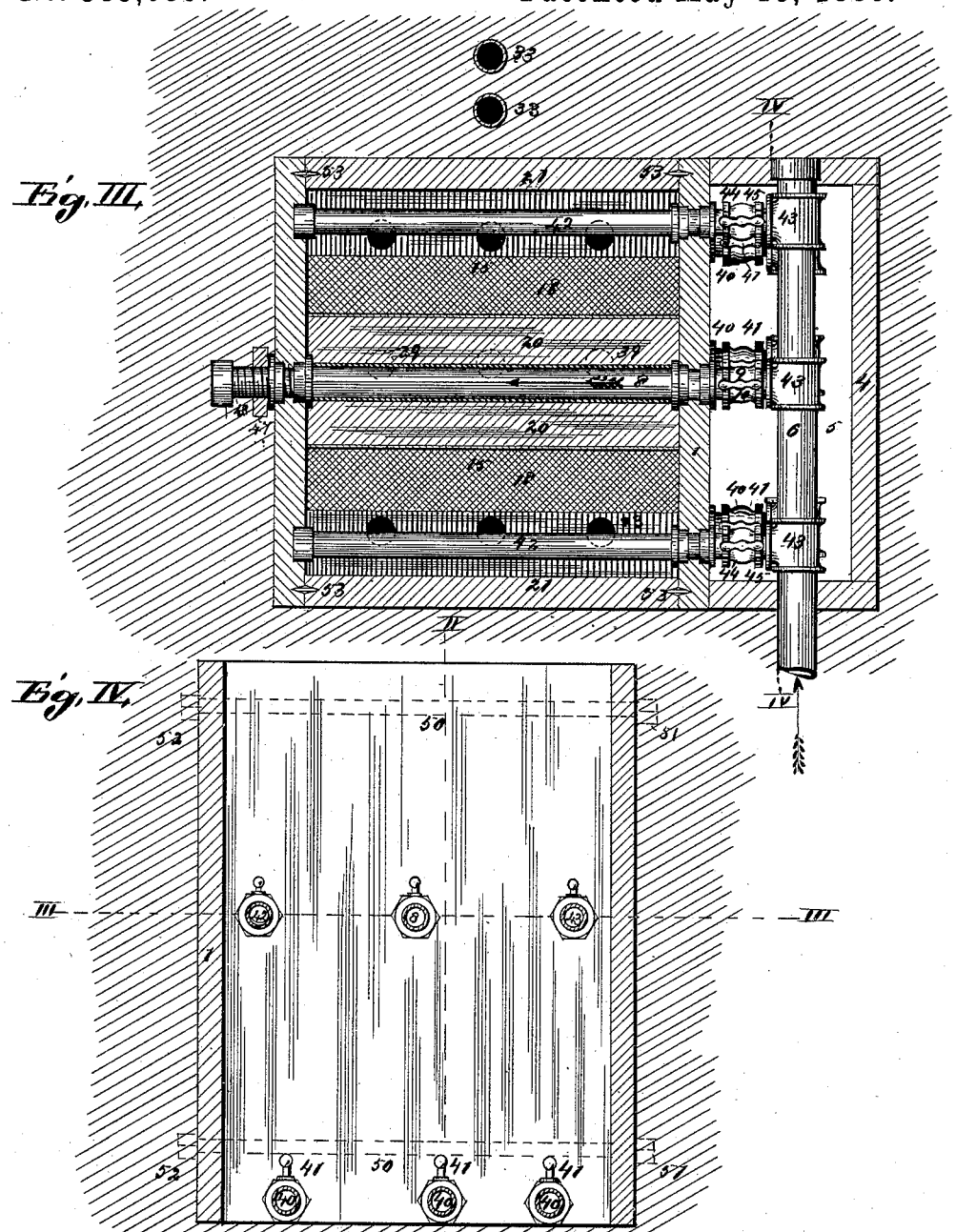

(No Model.)  3 Sheets—Sheet 3.
W. WITTHOEFT, Jr.
AUTOMATIC STATIONARY WATER FILTER.
No. 383,089. Patented May 15, 1888.
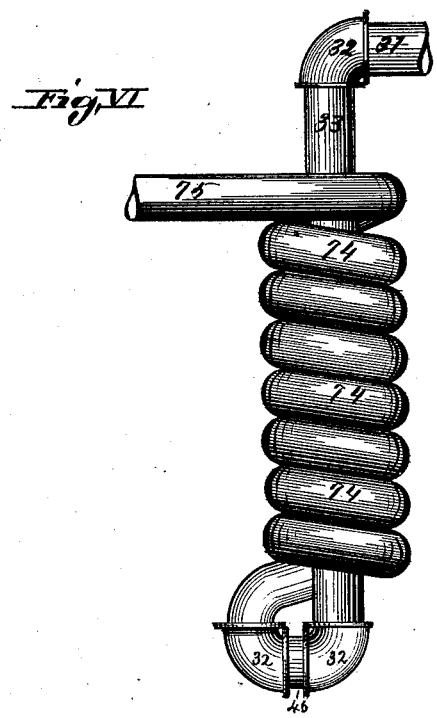
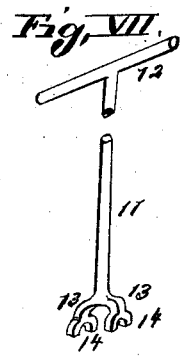
Attest:
H. S. Knight
F. A. Hopkins
Inventor:
William Witthoeft Jr.
By Knight Bros.
Attys.

UNITED STATES PATENT OFFICE.

WILLIAM WITTHOEFT, JR., OF ST. LOUIS, MISSOURI, ASSIGNOR OF ONE-THIRD TO LOUIS F. BOECKSTIEGEL, OF SAME PLACE.

AUTOMATIC STATIONARY WATER-FILTER.

SPECIFICATION forming part of Letters Patent No. 383,089, dated May 15, 1888.

Application filed March 21, 1887. Serial No. 231,711. (No model.)

*To all whom it may concern:*

Be it known that I, WILLIAM WITTHOEFT, Jr., of the city of St. Louis, in the State of Missouri, have invented a certain new and useful Improvement in Automatic Stationary Water-Filters, of which the following is a full, clear, and exact description, reference being had to the accompanying drawings, forming part of this specification, and in which—

Figure I is a vertical section on line I I, Fig. II, showing my filter with its supply-pipe and its connection with the water-main and the tap for letting on and shutting off the supply, with the detachable key that operates all the cocks or valves, and it shows the central washout-pipe below the filter, its connection with the sewer, and the cock by which the discharge is regulated. It also shows the double tank and the secondary filter that separates them, with the outlet into the delivery-pipe at top that connects with the cooling-coil. Fig. II is a vertical section on line II II, Fig. IV, showing the conical filter, the washout-pipes for carrying the wash to the sewer, the double tank or filtering-chambers with the secondary filter that separates them, and the delivery-pipe discharging into the cooling-coil. Fig. III is a horizontal section on line III III, Fig. IV, showing the water-main from which the supply is received, the supply-pipe, and douche-pipes for effecting the washout. It also shows the cocks by which the supply from the main is regulated and a cross-section of part of the cooling-coils. Fig. IV is a horizontal section on line IV IV, Fig. III, showing the inlet of the supply and douche pipes and the outlet of the washout-pipes that connect with the sewer. Fig. V is a detail modification of the floor or partition that supports the secondary filter, showing one of the slats and their means of attachment. Fig. VI is a modification of the cooling-coil, in which the pipe, instead of being formed in parallel return-coils on its return, winds around the primary pipe; and Fig. VII is a perspective view showing the key with its bifurcated forks for grasping the handles of the cocks when operating the same.

This invention relates to a stationary filter and water-cooler for use in connection with hydrants; and the invention consists in features of novelty hereinafter fully described, and pointed out in the claims.

Referring to the drawings, forming part of this specification, in which similar figures indicate like parts in all the views, 1 represents the sides, 2 the bottom, and 3 the top of the frame or case of the water-tank that incloses the filter, and 4 is the casing around the operating-chamber 5, through and in connection with which the water-main 6 and sewer-pipe 7 are located. These cases are preferably made of wood, but may be of any other suitable material.

The filter, with its adjacent operating-chamber, is generally sunk in the ground until the top is about level with the surface of said ground or pavement.

8 is the supply-pipe, which is connected with one of the three-way joints 43 in the water-main by the valve-joint 9, which is operated by the cock 10 for turning on or off the supply from the main. The handle of said cock—as also are those of the other cocks—is operated by a key-rod, 11, turned by a T-handle, 12, above, and having forks 13, whose bifurcated arms 14 engage the handle of the cock to turn it. By this means the cocks are all reached and operated without the operator descending within the chamber; but the chamber is of sufficient size to enable a workman to descend if repairs at any time are needed.

15 represents a double-walled filtering-screen, made of woven wire and of inverted-V shape in cross-section, fastened to a wooden foot-board, 16, that is secured to the bottom of the tank by screws 17, and is filled with charcoal, sand, or other suitable filtrant, 18. The bottom of the filtering-screen rests on the bottom of the tank, and its top surmounts the supply-pipe, from which the water is discharged through perforations 19 in said pipe. A chamber, 20, in the lower division of the tank is thus formed that receives the unfiltered water, which afterward continually percolates through the filtrant within the filtering-chamber 15 and enters the chambers 21 in same tank on each side of the filter.

22 represents a slatted floor or partition, which rests on side brackets, 23. This partition is made of slats or bars 24, preferably of wood, set on edge parallel with each other, leaving very narrow apertures 25 between the slats, which are relatively secured to each other and in said position by the wire or cord 26, that winds around and between the bars. A woven-wire-mat screen, 27, rests on the slatted floor, and a layer of charcoal, sand, or other filtrant, 28, is laid thereon.

The water has its first settlement in chamber 20, and then passes through the first filtrant medium, as described, into chamber 21, where it is again settled, and the now nearly-pure water then ascends under hydrant-pressure through the apertures between the slats, the gauze or woven-wire mat, and filtrant material into the upper division of the tank 29, by which time it has been cleansed from its impurities and passes from the filtering to the cooling process. The clear water next passes through the perforations 30 into the pipe 31, and through the elbow-joint 32 into the cooling-coil composed of the parallel pipes 33 and return-bends 34, which discharge through the elbow-joint 35 into a horizontal pipe, 36, that connects with and discharges into the usual hydrant-pipe, from which it is drawn by the faucet.

The vertical parallel pipes of the cooling-coil may be made of any required length, and it is preferred that they should be of sufficient length to descend a considerable distance below the filter to sufficiently cool the water without the use of ice, thus saving both trouble and expense and providing the water in a more wholesome condition than when its temperature has been lowered by the introduction of ice.

Three drain-pipes constructed of link-pipes 37, united by three-way T-joints 38, and connecting through the floor with the water-chambers 20 and 21 by short vertical pipes 39, provide an outlet for the settlings that gather in said chambers, and said settlings are carried off to the sewer 7, into which the drain-pipes discharge through valve-joints 40, that connect with three-way T-joints 41 in the sewer-pipe. The said valves are operated by stop-cocks 41, which, like the other cocks, are worked by the long key 11, which reaches down through the chamber 5 to work the cocks without the operator descending. I prefer to adjust the cocks from the drains connecting with the chambers 21 to drip slowly into the sewer to carry off the most of the small amount of settlings that gather in those chambers from the partly-filtered water. The cock from the middle drain that connects with chamber 20, that holds the unfiltered water and consequently collects more settlings, is preferably turned on rather more freely than the others to carry off its larger deposits. It will be seen that thus automatic means is provided for the continuous discharge of the settlings from the filter, that prevents it from choking and enables the other features in the process to work more perfectly without clog or hinderance.

Notwithstanding the above continuous automatic action, which for a time is amply adequate to carry off the settlings, there are occasionally further means used for douching and washing out the filter, for which purpose I provide the douche-pipes 42, that are connected with the three-way T-joints 43 in the water-main by valve-joints 44. The said valves are operated by the cocks 45, which are turned by the same key that turns the other cocks.

When it is desired to thoroughly cleanse the filter, the cocks 41 are turned to give free vent from the filter through the drain-pipes into the sewer-pipe, and the water is then turned on with full force through the supply-pipe and the douche-pipe by turning the cocks 10 and 45 to open the valves to their full capacity. By this means the chamber 21 is completely cleansed in a short time without opening up into the interior, after which the cocks are again returned to their normal position and the filter proceeds with its work.

The combined automatic operation of the drip, causing a continuous discharge of the settlings into the drain-pipe, in conjunction with the occasional operation of the douche above described, removes the difficulty from choking often experienced, especially in large stationary filters, which it is almost impracticable to clean by hand, and with its cooling and other devices especially adapts this filter for stationary use in connection with hydrants and for heavy work, as in city reservoirs, &c.

The nut 47 of the solid-threaded extension 48 of the supply-pipe, in conjunction with the flanged collar 49 near the other extremity of the pipe, clamps the two sides of the filter-tank that are pierced by the pipe to keep them from spreading.

Two or more screw-threaded bolts or rods, 50, by the clamping-pressure of their heads 51 and nuts 52, hold the other two sides of the tank from spreading. I have only shown two of these rods, but may use any desired number. It is evident that in large filters for heavy work—such as would be required for large establishments and for public reservoirs—the number of these rods could advantageously be largely increased. If said rods are passed through the marginal overlaps where the side pieces project beyond the end pieces, as such rods should be placed in large filters especially, the same rods brace both side and end pieces of the tank.

I match the pieces of the filter-tank together by double tongues 53 and cement the joints with hot tar, pitch, or other bituminous substance. The bottom piece of the tank should be placed with the grain end on toward the end pieces, so that its season shrinkage may accord with that of the ends.

I have shown my filter as used in a rectangular case or tank constructed of wood; but I do not so confine myself, for the form of the tank and the material of which it is composed may very properly vary more or less, according to circumstances, and the tank may be built in round or barrel form and bound together by bands or hoops, or it may be made of any other suitable form to accommodate itself to the position in which it is placed; also, although in most situations wood is preferable for the tank, yet it may be made of any other suitable material.

In Fig. V is shown a modification of the floor or partition 22, that separates the upper from the lower tank or chambers, and supports the gauze or woven-wire mat and filtrant. In this modification I secure the wooden slats 24 in their relative position to each other by straps 54, preferably of metal, that are placed both above and below the slats. I connect these straps by rectangular clutches 55, and by that means clamp the slats.

In Fig. VI is shown a modification of the cooling-coil, in which, after the water descends the vertical pipe 33, it passes through two elbow-joints, 32, and a short connecting-pipe, 46, that connects them, and then, instead of passing upward, as in my preferred form, through a second vertical pipe, it ascends through a pipe, 74, preferably of lead, that coils around the pipe, through which it had descended, and eventually passes direct through the pipe 75 to the hydrant-pipe, from which it is discharged by the faucet. Like the cooling-coil in Fig. II, the vertical pipe may be made of any required length and be sunk in the ground to any required depth to cool the water sufficiently for use. The pipes, with the exception of the last-mentioned lead coil pipe, are preferably of iron, but may be of stoneware.

When the filter is connected with the water-main, especially with those that have a powerful head, care should be taken when the water is first turned on by only partially turning the cock that opens to the supply-pipe, so that it may enter the filter-tank gradually and not present too great a strain by the first rush of water on any part of the filter previous to such parts being backed by the water that ultimately fills the tank throughout all its chambers. When the tank is full, which will be known by the discharge of water from the faucet of the hydrant, the cocks may be turned to let on a full supply without danger of injury to the filter.

I claim as my invention—

1. The combination, with a tank and the filtering-wall, of inverted-V shape, placed therein so as to form settling-chambers 20 and 21, the supply-pipe 8, communicating with the chamber 20 at top, pipes communicating with each of said chambers at bottom for carrying off sediment, and a pipe for the escape of the purified water communicating with the top part of said tank, substantially as set forth.

2. The combination, with a tank and a filtering-wall, of inverted-V shape, placed therein so as to form settling-chambers 20 and 21, a valved pipe for the escape of sediment communicating with the bottom of each of said chambers, and the supply and douche pipes 8 42, communicating with the respective chambers 20 and 21 at top, substantially as and for the purpose set forth.

3. The combination, with the tank and the filtering-wall dividing it into settling-chambers 20 21, situated side by side, of the supply-pipe 8, communicating with the top portion of the chamber 20, the douche-pipes 42, communicating with the top portions of the chambers 21, the water-main with which said pipes 8 and 42 communicate, the pipe for conveying away the purified water, and the pipes 39, communicating with the bottom portions of the chambers 20 21 and with the sewer, substantially as set forth.

WILLIAM WITTHOEFT, JUNIOR.

In presence of—
BENJN. A. KNIGHT,
SAML. KNIGHT.